United States Patent [19]
Gezari et al.

[11] Patent Number: 5,458,399
[45] Date of Patent: Oct. 17, 1995

[54] BOAT SEAT ARMREST WITH INTEGRAL JOG LEVER

[75] Inventors: Walter A. Gezari, Calverton; Robert S. Stidd, Center Moriches, both of N.Y.

[73] Assignee: Stidd Systems, Inc., Greenport, N.Y.

[21] Appl. No.: 160,510

[22] Filed: Dec. 1, 1993

[51] Int. Cl.$^6$ ................................................ A47C 7/54
[52] U.S. Cl. .......................... 297/411.2; 297/217.3; 297/423.38; 297/423.26; 297/411.38; 297/463.1; 114/144 A
[58] Field of Search .................. 297/344.13, 344.18, 297/344.21, 423.26, 423.28, 423.38, 411.35, 411.38, 411.2, 411.3, 411.32, 411.37, 217, DIG. 4, 463, 217.1, 217.3, 463.1; 114/363, 144 E, 144 A; 440/6

[56] References Cited

U.S. PATENT DOCUMENTS

| | | | |
|---|---|---|---|
| 4,200,166 | 4/1980 | Hansen | 297/411.35 X |
| 4,614,246 | 9/1986 | Masse et al. | 297/DIG. 4 X |
| 4,700,648 | 10/1987 | Trefethern et al. | 114/363 X |
| 4,730,571 | 3/1988 | Hedlund et al. | 440/6 X |
| 5,042,607 | 8/1991 | Falkenson et al. | 297/DIG. 4 X |
| 5,171,063 | 12/1992 | Stidd | 297/DIG. 1 X |

FOREIGN PATENT DOCUMENTS 122793  5/1989  Japan ................................. 114/363

*Primary Examiner*—Kenneth J. Dorner
*Assistant Examiner*—Milton Nelson, Jr.
*Attorney, Agent, or Firm*—Schweitzer Cornman & Gross

[57] ABSTRACT

An improved boat seat includes an adjustable footrest and an integral steering control mounted to an armrest. The footrest is height-adjustable, and is pivotable between operative and retracted positions at any chosen height. The steering control is mounted to the distal end of the armrest, and is at least partially embraced and covered by an armrest pad.

2 Claims, 4 Drawing Sheets

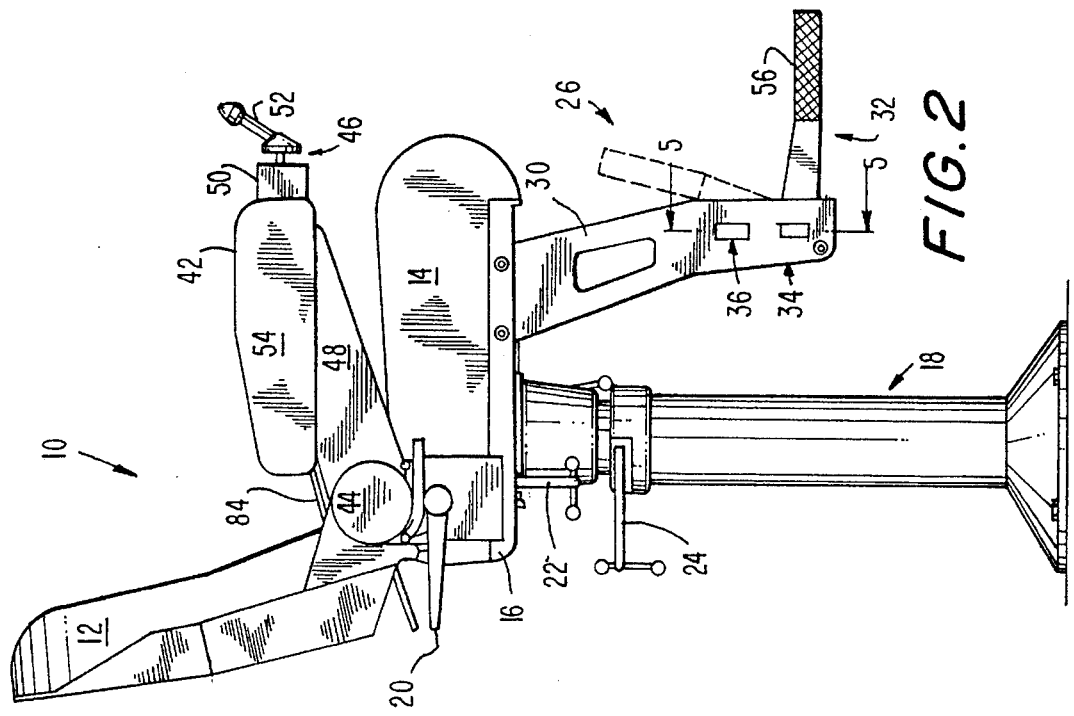
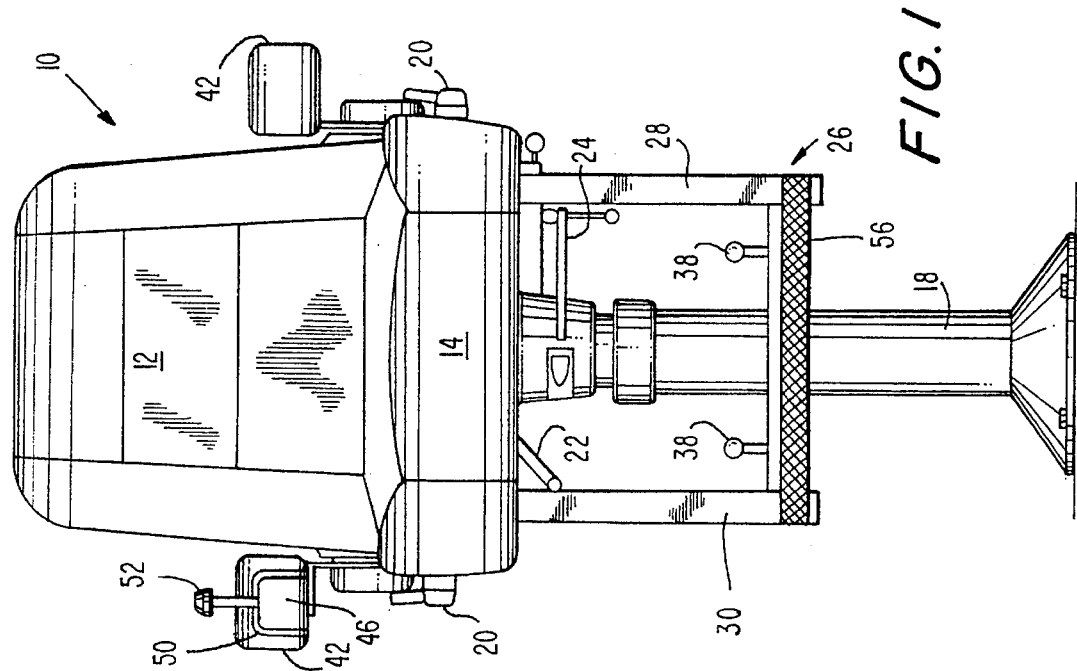

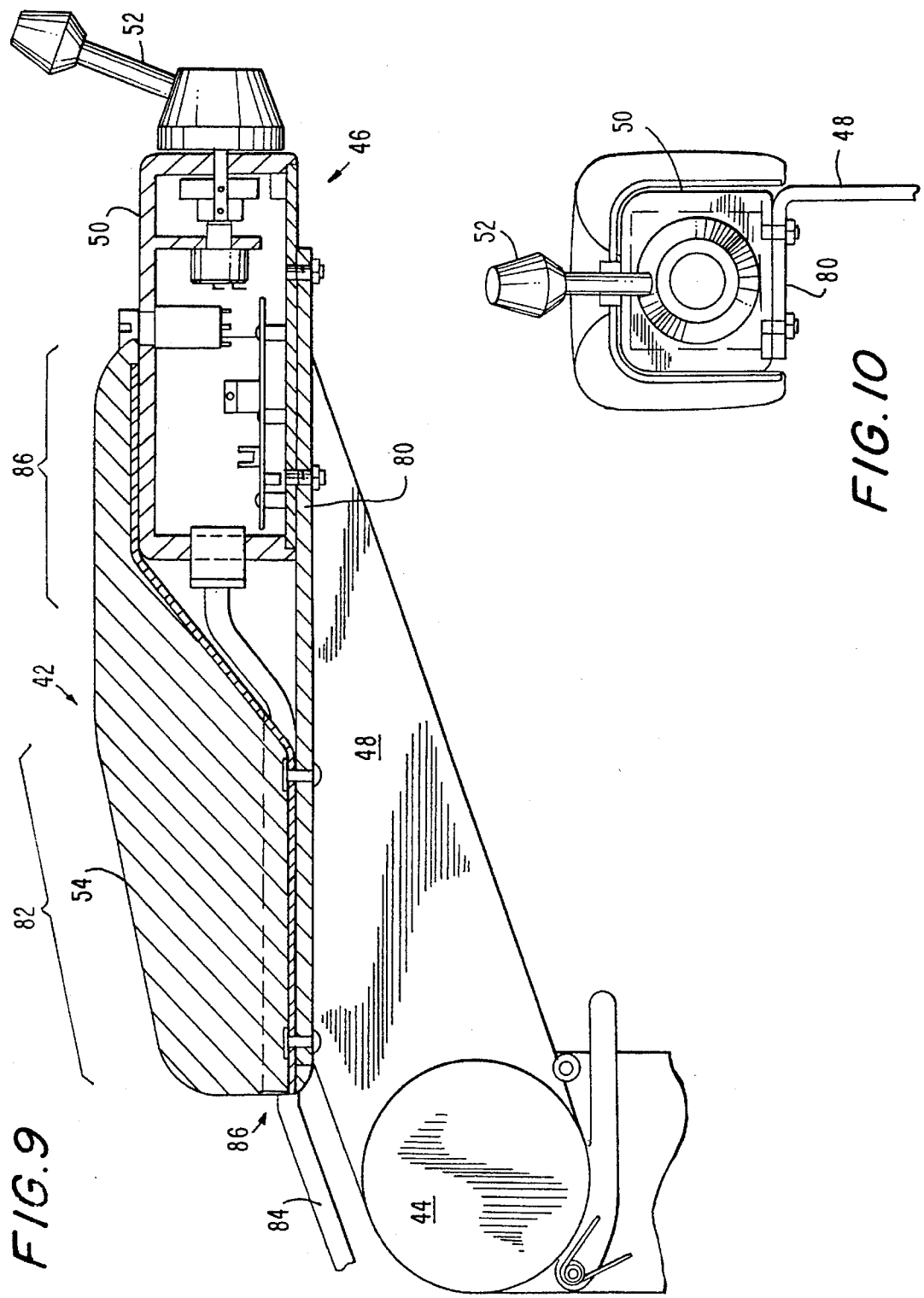

BOAT SEAT ARMREST WITH INTEGRAL JOG LEVER

The present invention relates to improvements for a seat intended to be used in a boat and in particular for a captain's or helmsman's seat, wherein a chair-mounted steering lever is provided. In addition, the present invention relates to such a seat having an adjustable footrest.

BACKGROUND OF THE INVENTION

Proper design practices for boat seats, like seats of other vehicles, requires that they accommodate persons of varying physical attributes. In addition, they should have the capability of adjusting to best accommodate the varying needs of the occupant. For example, the occupant may wish at some time to have his or her feet supported on a raised footrest. At other times, maximum comfort and user efficiency may best be accommodated by the footrest being moved out of the way, so that the user may stand in front of and lean against the seat cushion without contacting the footrest.

A helmsman in particular may require a variety of seating positions to effectively carry out his duties. In addition to seating comfort, it may be advantageous to such a user to have at his command a means for controlling the boat which is accessible irrespective of the position and attitude of the seat. The helmsman may wish, for example, to turn the seat from its forward direction during docking or maneuvering to provide better visibility, while at the same time maintaining control over the steering. Requiring the user to maintain hold of a fixed steering wheel or helm while turned can place the user in an awkward position. Indeed, when the seat is rotated substantially toward the aft, hold of the helm may be completely prevented.

It is accordingly a purpose of the present invention to provide a footrest for use in conjunction with a boat seat or similar structure which can easily be adjusted to accommodate various users.

It is a further purpose of the present invention to provide such a footrest which may be easily adjusted amongst a plurality of height positions.

Yet another purpose of the present invention is to provide such a footrest which may be pivoted between a first, generally horizontal position and a second, generally vertical position in which the footrest is retracted and placed in a non-operative, and non-interfering, position.

Another purpose of the present invention is to provide an armrest for a boat seat and the like which includes an integral steering mechanism.

Still another purpose of the present invention is to provide such an armrest in which a steering mechanism is accessible to the user irrespective of the orientation and adjustment of the seat with which it is utilized.

BRIEF DESCRIPTION OF THE INVENTION

The above and other objects are met by aspects of the present invention for use in conjunction with a seat, which may be of conventional construction, having back and seat portions mounted upon an appropriate pedestal. The seat and back portions may be adjustable as known in the art. Extending downwardly from the seat is a footrest assembly, having a pair of spaced, generally vertical footrest hanger arms. A support bar extends between the lower ends of the hanger arms, and supports a forwardly projecting, transversely extending footrest plate. The ends of the support bar are provided with lock members, which are adapted to engage mating lock elements in the footrest hanger arms. When the lock members are released from engagement with the hanger arms, the footrest unit may be raised or lowered and subsequently locked in place by allowing the lock members to engage another mating lock element on the hanger arms.

The lock members may further serve as pivot means for the footrest portion. Operating handles for the lock members may be utilized to allow the support bar and affixed footrest to rotate between a first, generally horizontal position and a second, vertical position, the footrest portion being locked in one of the two positions by engagement of at least one of the handles with an appropriate detent in the support bar. Rotation of the footrest portion is controlled independently from its vertical positioning, allowing rotation to occur irrespective of the height at which the footrest unit is placed.

To allow the seat occupant to control the vessel from the seat without use of a fixed helm control, an auxiliary steering mechanism or "jog lever" is incorporated as part of a seat armrest. The armrest consists of a rigid arm member having a bracket portion along its top edge to which the jog lever mechanism housing is mounted. An armrest cushion, having its forward portion in the general shape of an inverted U, is also mounted to the bracket, and covers the rear portion of the jog lever assembly. The control arm of the jog lever mechanism extends forwardly, beyond the end of the armrest member, and is thus situated such that it may be easily operated by an individual sitting in the chair with his or her arm either free or resting upon the armrest associated with the jog lever.

BRIEF DESCRIPTION OF THE DRAWINGS

A fuller understanding of the present invention and the features and objects thereof will be obtained upon consideration of the following detailed description of a preferred, but nonetheless illustrative embodiment of the invention when reviewed in conjunction with the annexed drawings, wherein:

FIG. 1 is a front elevation view of a seat including the armrest jog lever and footrest of the present invention;

FIG. 2 is a right side elevation view of the seat, depicting the footrest in both lowered and raised positions;

FIG. 9 is a detailed elevation view, partially cut away, of the seal arm bearing the jog lever; and FIG. 10 is an enlarged front elevation view of the seat arm.

DETAILED DESCRIPTION OF THE INVENTION

Figure 3:
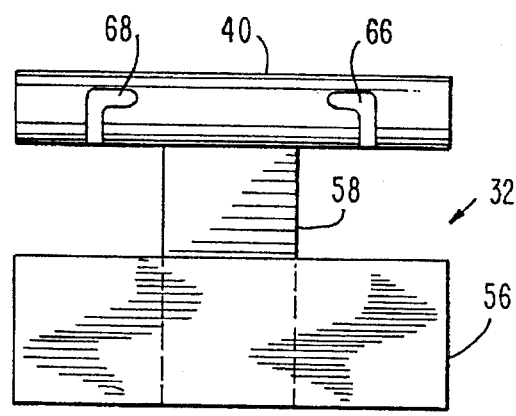
FIGS. 3 and 4 are top plan and side views depicting the rotating portion of the footrest assembly.

Referring initially to FIGS. 1 and 2, a seat unit 10 bearing the improvements of the present invention is of generally conventional construction, having a backrest portion 12 and a seat portion 14 both affixed to a frame 16 which, in turn, is mounted to pedestal 18. As known in the art, the seat backrest portion 12 may be angularly adjustable by use of an adjustment lever 20, while the front-to-back positioning of the seat and back with respect to the pedestal may be adjusted by use of seat-slide clamp 22. The height of the seat may be adjusted by an appropriate telescoping means locked in position by vertical height adjustment clamp 24.

Mounted to the frame 16 is the footrest assembly 26, comprising footrest hanger arms 28 and 30, which extend downwardly and slightly forwardly from their point of attachment with the frame and support the adjustable footrest portion 32. A rigid spreader (not shown) may extend between the lower portions of the hanger arms to maintain their rigidity and spacing. The lower end of each hanger arm is provided with at least two rectangular apertures 34, 36 which define the heights at which the supported footrest portion 32 may be positioned. As shown in FIG. 2, the footrest portion 32 is further pivotable between a first, generally horizontal position and a second, elevated position in which it is oriented essentially vertically, and retracted from use. A pair of control arms 38 project from the footrest support tube 40 which extends between the hanger arms. The control arms provide control means for both the vertical positioning of the footrest portion as well as its rotational position.

The seat unit is provided with a pair of armrests 42 which may be pivotable about armrest bearings 44 as known in the art. Jog lever control mechanism 46 is shown located upon the right armrest, and is mounted to armrest arm 48. The jog lever mechanism 46 includes a housing 50 in which the operational components are located, as well as a forwardly-extending operating arm 52, which is manipulated by the operator to control the craft as known in the art. The right arm cushion 54 extends along the armrest arm and embraces and protects the rearward portion of the jog lever housing.

Figure 4:
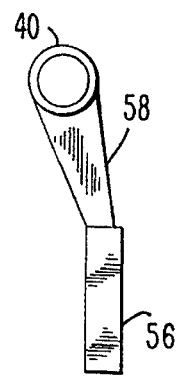

Referring to FIGS. 3 and 4, the rotatable footrest portion 32 can be seen to comprise support tube 40, which extends between the hanger arms 28, 30, and which supports the footrest 56 mounted at the end of strut 58. The footrest may have an appropriate incised surface to improve footing or may be covered with a nonslip surface. Typically, the footrest apparatus is constituted of a durable, non-corrosive material, such as a known aluminum formulation.

Figure 5:
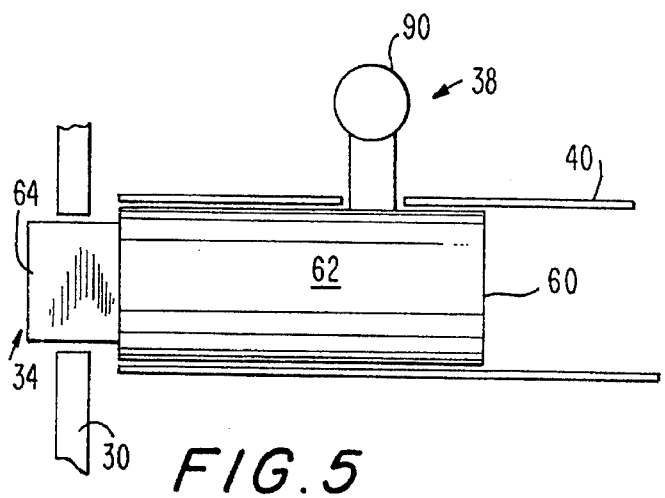
FIG. 5 is a sectional view taken along line 5—5 of FIG. 2 of the interconnection between the mounting of the footrest portion and the hanger arms.
Figure 6:
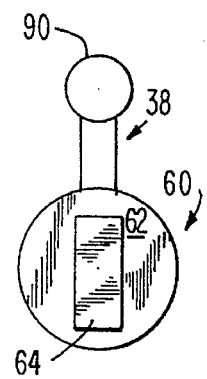
FIG. 6 is a side elevation view of the footrest mounting means.

The means to adjust the height of the footrest portion and lock it on the hangers at the chosen height is detailed in FIGS. 5 and 6. As shown therein, the adjustment/lock means may comprise a plunger unit 60 mounted within each end of the footrest support tube 40. Each of the plunger units consists of a cylindrical plunger body 62 slidable within the support tube having a rectangular plunger head 64 projecting outwardly from its distal end. The dimensions of the rectangular end are such that it may engage the rectangular apertures 34 and 36 in the hanger arms. A control arm 38 extends upwardly from the plunger body, and may be capped by ball 90.

Figure 8:
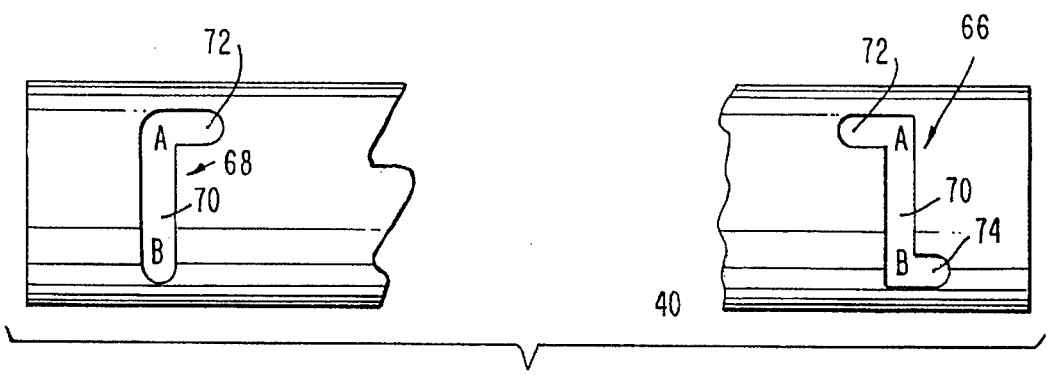
FIG. 8 is an enlarged view of the detent means in the support bar.

Each control arm 38 extends through the footrest support tube 40 through one of control apertures 66 and 68. As may be best seen in FIG. 8, the left control aperture 66 includes first portion 72, aligned with the major axis of the support tube, allowing the projecting control arm and thus the attached plunger unit 60 to move transversely within the support tube, whereby the plunger head 64 may be selectively engaged and disengaged with a chosen aperture in the hanger arm.

The second portion 70 of the aperture, extending in a circumferential direction about the support tube, allows radial rotation of the support tube about the plunger as a bearing, thus permitting the footrest portion 32 to rotate between its raised and lowered positions when the plunger head is engaged with the hanger.

The third portion 74 of the control aperture allows for further transverse motion of the plunger unit, causing the plunger head 64 to extend to a greater degree through the rectangular aperture, and exposing it beyond the outwardly facing surface of the hanger arm, while locking the footrest portion against further rotation.

The right control aperture 68 contains similar first and second portions 72 and 70, but does not include the third portion 74. Accordingly, lock of the footrest portion in the raised position is accomplished solely by the left control aperture. Each of the control apertures subtends an arc of approximately 75 degrees about the circumference of the support tube 40, and accordingly defines the limits for rotation of the footrest portion. The apertures are oriented upon the support tube such that the footrest is in the lower, horizontal position as shown in FIG. 2 when the control arms 38 are engaged with the respective first aperture portions 72.

Figure 7:
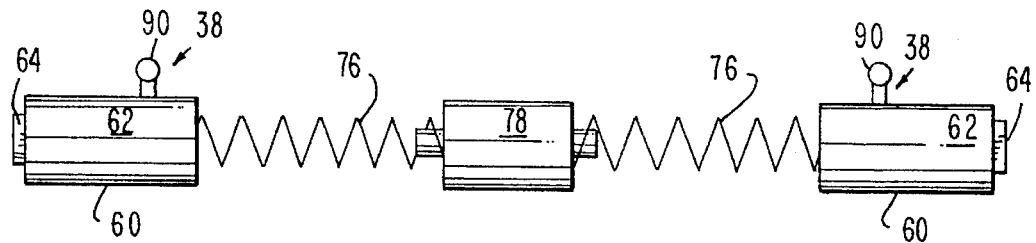
FIG. 7 is a schematic presentation of the interconnection and biasing of the connection means.

As depicted in FIG. 7, the plunger units are biased outwardly by use of a pair of springs 76, mounted within the support tube 40 between the inwardly facing ends of the plunger bodies 62 and a centrally located spring spacer 78. With the footrest in the lower, horizontal position, the control arms 38 are biased to rest at the intersection between the first and second portions of the control aperture as denoted by point A. The lever arm created by the strut 58 and footrest 56 generates a counterclockwise force (with respect to FIG. 2) about the plungers, maintaining the footrest unit in the horizontal position.

When it is desired to rotate the footrest unit to the raised, vertical position, it is necessary only to lift the footrest 56, the support tube 40 rotating about the cylindrical plunger bodies 62 about an arc defined by the length of the second portions 70 of the control apertures. When the footrest is fully rotated to the vertical position, with the control arms 38 at location B, the outward bias exerted against the left plunger unit forces the control arm and plunger unit to move outwardly along the track defined by third aperture portion 74, causing the plunger head to extend further through the appropriate aperture in the left hanger. The footrest is then maintained in the upper position, as the left control arm 38 is engaged with the wall of third aperture portion 74.

As the footrest portion is not in an equilibrium position, moving the left control arm to its right, back to position B, allows the footrest portion to rotate downwardly (clockwise in FIG. 2) under the influence of gravity to its initial horizontal position. Typically, the left plunger head projects outwardly through the hanger aperture, allowing a touch to the exposed end of the plunger head by the foot to move the plunger inwardly to disengage the lever, thus allowing the footrest to drop without further assistance from the chair's occupant. Alternatively, of course, the left control arm can similarly be repositioned to release the footrest portion.

Referring next to FIGS. 9 and 10 in which the armrest aspect of the invention is detailed, the right armrest 42 includes armrest arm 48 pivotally mounted to the seat frame at bearing 44 as known in the art. The jog lever mechanism 46 is mounted to the distal end of the arm, the arm being formed with a top bracket portion 80 extending perpendicularly outward from the main portion of the arm. The mechanism may be one of a variety of units known in the art, such as manufactured by Robertson Marine Electronics of Norway. The bracket is adapted to support both the jog lever housing 50, as well as the arm cushion 54. The jog lever housing is mounted to the bracket 80, whereby the forward end of the housing extends beyond the end of the armrest, allowing the operating arm 52 of the jog lever mechanism to be fully accessible and operable as required.

The cushion 54, which is also affixed to the bracket 80 along its lower surface, includes a rearward portion 82 having a transverse bore 88 proximate its lower surface to allow passage of an electronic cable 84 for the jog lever mechanism. The forward portion 86 of the cushion is provided with an aperture, open at its forward face, to accept the rearward portion of the jog lever housing. So dimensioned, the formed cushion portion wraps about the housing, protecting it and covering the point at which the electronic cable enters the housing.

We claim:

1. A boat seat armrest, comprising an arm having a first end for mounting to a boat seat and a remote distal end and having a bracket plate formed as a part thereof; a jog lever unit having a housing and a control arm extending from said housing mounted to the distal end of said arm whereby the control arm of said jog lever unit extends forwardly beyond said arm; and a cushion mounted to said arm having a first cushion portion surrounding and embracing a rearward portion of said jog lever housing.

2. The armrest of claim 1, wherein said cushion has a second cushion portion rearwardly of said jog lever housing and a passageway extending through said second portion to accommodate an electronic cable for said jog lever unit.

\* \* \* \* \*